Patented Oct. 17, 1922.

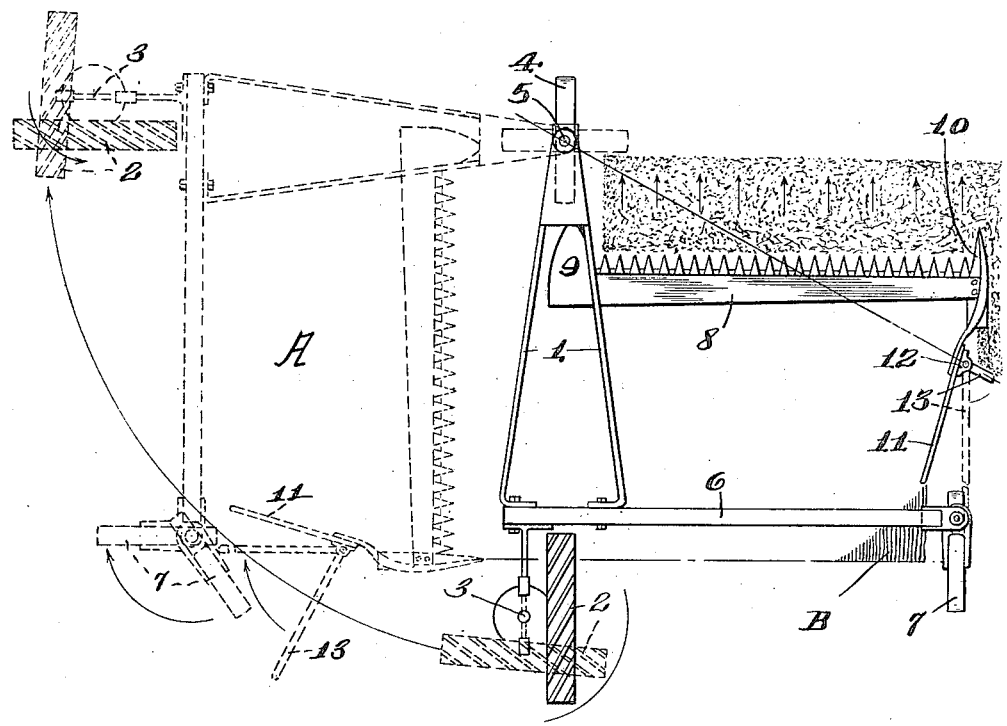

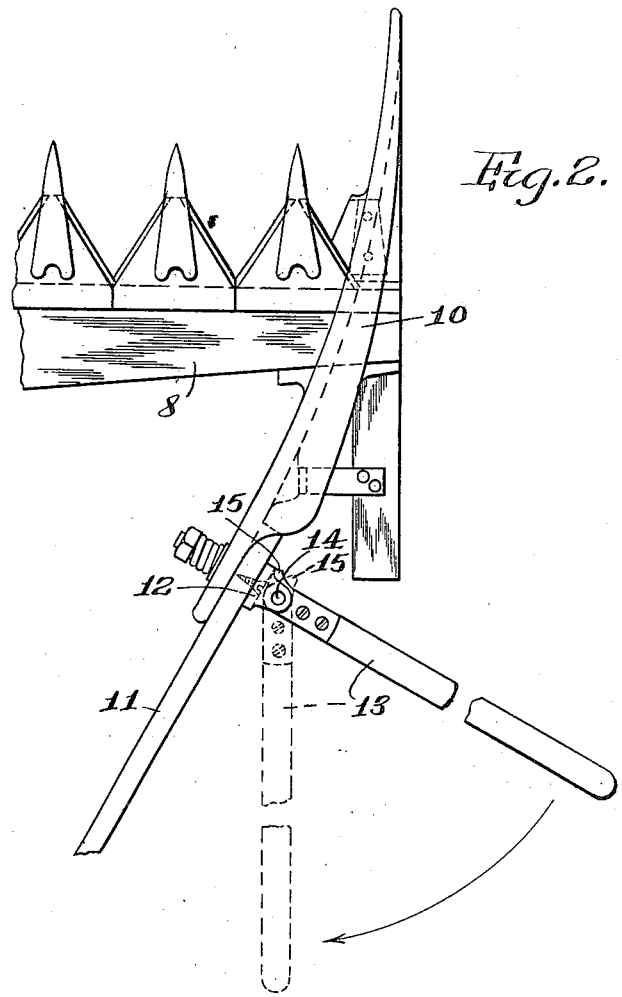

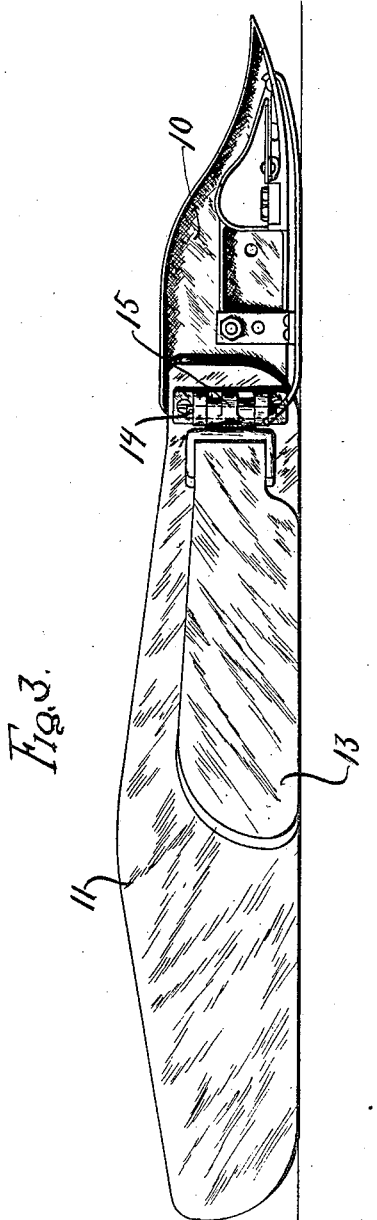

1,432,014

UNITED STATES PATENT OFFICE.

ALEXANDER T. BROWN, OF SYRACUSE, NEW YORK.

SWATH BOARD FOR MOWING MACHINES.

Application filed February 18, 1919. Serial No. 277,853.

*To all whom it may concern:*

Be it known that I, ALEXANDER T. BROWN, a citizen of the United States, and a resident of Syracuse, in the county of Onondaga and State of New York, have invented a certain new and useful Swath Board for Mowing Machines, of which the following is a specification.

This invention relates to mowing machines and has for its object a swath board arranged to sweep the portion of the cut crop as alfalfa, grass, grain, etc., not swept by the knife bar and regular swath board when the machine is being given a quarter turn at a corner by swinging the rear end of the machine around backwardly from the standing crop about an axis located at or near the front end of the machine, so that when such quarter turning is completed there is none of the cut crop in front of the knife, when the machine is again moved forwardly along another side of the uncut crop.

The invention consists in the novel features and in the combinations and constructions hereinafter set forth and claimed.

In describing this invention, reference is had to the accompanying drawings in which like characters designate corresponding parts in all the views.

Figure 1 is a plan view of a mower embodying my invention, the position of the mower when turned at a corner being indicated in dotted lines.

Figure 2 is an enlarged detail plan view of the outer end of the mower bar, shoe carried thereby, and the swath board, one form of knife support being shown in my Patent No. 1,247,073, dated Nov. 20, 1917. Fig. 3 is an elevation looking to the left, Fig. 2.

The swath board is here shown as embodied in a mower driven by power from a tractor wheel turnable about a vertical axis to position the machine such as shown in my Patent No. 1,247,073, issued November 20, 1917. But, obviously, the swath board may be embodied in other forms of mowing machines.

1 designates the frame of the mower, 2 the tractor wheel which is here shown as located at the rear end of the frame and as turnable about a vertical axis 3 as indicated in Fig. 1 for the purpose of positioning the machine relatively to the uncut crop when a corner is reached.

4 is a steering wheel at the front of the frame which wheel 4 may be also movable about an upright axis 5 by suitable means not shown, as a steering post and wheel to steer the machine.

In the use of the machine in cutting the crop, the wheel 4 may also be used to guide the machine along a straight course but in turning corners the tractor wheel 2 is usually employed.

The operation of the tractor wheel 2 forms no part of this invention.

6 is a laterally extending frame member having a caster wheel 7 at its outer end.

8 is a laterally extending cutter bar with which a suitable reciprocating knife coacts in the usual manner, the cutter bar having the shoes 9, 10 at its inner and outer ends. The cutter bar is supported to float over the ground in any suitable manner and as this feature forms no part of this invention, further description is thought to be unnecessary.

11 is a swath board extending rearwardly from a bracket 12 at the rear end of the outer shoe 10, and 13 is a second swath board located in the rear of the outer end of the cutter bar and the shoe 10 and movable into position to extend laterally beyond the end of the cutter bar and the shoe. When the swath board 13 is in its laterally extending position, it is preferably in substantial radial alinement with the turning axis 5 of the machine about which the machine is turned by the tractor wheel 2 when swung into position indicated by A in dotted lines, Fig. 1.

This swath board 13 is hinged or pivoted at 14 to the bracket 12 or to the base of the swath board 11 and is foldable from its laterally extending position rearwardly and inwardly into position shown in dotted lines, Fig. 2.

The swath board 13 is provided with a suitable stop 15 to limit the forward swinging thereof and hold it in its laterally extending position during rearward movement of the outer end of the cutter bar.

In operation, during the movement of the machine along one side of the crop being cut, the swath board 13 swings by reason of its engagement with the ground or the stubble automatically into its position indicated in dotted lines in Figs. 1 and 2, and when a corner is reached and the machine is swung about its turning axis 5 from its position as shown in full lines, Fig. 1 to that shown in dotted lines, the swath board 11 and the cutter bar 8 sweeps the cut crop lying behind the cutter bar backwardly, and the swath board 13 automatically swings by reason of its engagement with the stubble on its pivot into its laterally extending position and sweeps that portion of the cut crop indicated by B and not within range of the swath board 11 and the mower bar 8, backwardly so that when the machine is in the position indicated in dotted lines, Fig. 1, all the cut crop which lay directly behind the cutter bar, when the machine was in the position indicated in full lines, Fig. 1, has been swept backwardly by the members 8, 11 and 13 so that none of the cut crop is in front of the knife when the machine is again started forwardly.

What I claim is:

1. A mowing machine having a cutter bar, having a shoe at its outer end and a swath board normally extending rearwardly, said swath board being pivoted to the shoe on an upright axis and movable about its axis into position in which it extends laterally in a direction lengthwise of the cutter bar and beyond the end of the cutter bar and the shoe by engagement with the ground during rearward movement of the outer end of said bar and said shoe, and a stop for limiting the outward movement of the swath board, substantially as and for the purpose described.

2. In a mowing machine, the combination of a laterally extending cutter bar, a shoe at the outer end of the cutter bar having a rearwardly and inwardly inclined swath board carried by the shoe and located in the rear of the cutter bar and a second swath board located in the rear of the cutter bar, the second swath board being pivotally connected to the shoe by an upright pivot and normally extending rearwardly and movable on its pivot to extend outwardly and laterally in a direction lengthwise of the cutter bar beyond the shoe and the end of the cutter bar by engagement with the ground during backward movement of the outer end of said bar and said shoe, and a stop for limiting the outward movement of the second swath board, substantially as and for the purpose specified.

3. In a mowing machine, the combination of a frame, supporting wheels and a laterally extending cutter bar, the wheels being operable to swing the rear end of the frame about an axis located near the front end to position the machine to turn a corner, and a swath board normally extending rearwardly, said swath board being pivoted to the shoe on an upright axis and movable about its axis into position in which it extends laterally in a direction lengthwise of the cutter bar and beyond the end of the cutter bar and the shoe by engagement with the ground during rearward movement of the outer end of said bar and said shoe, and a stop for limiting the outward movement of the swath board, substantially as and for the purpose set forth.

In testimony whereof, I have hereunto signed my name, at Syracuse, in the county of Onondaga, and State of New York, this 10th day of Feb., 1919.

ALEXANDER T. BROWN.